United States Patent [19]

Clark

[11] Patent Number: 5,127,706
[45] Date of Patent: Jul. 7, 1992

[54] FIRE RETARDANT SEATING

[75] Inventor: Vaughn L. Clark, Martin, Mich.

[73] Assignee: Interkal, Inc., Kalamazoo, Mich.

[21] Appl. No.: 568,791

[22] Filed: Aug. 16, 1990

[51] Int. Cl.$^5$ .............................................. A47C 31/00
[52] U.S. Cl. ................................ 297/217; 297/DIG. 5
[58] Field of Search ................ 297/217, DIG. 5, 463, 297/188–194; 169/19, 54, 26, 56, 57, 62; 5/459, 483

[56] References Cited

U.S. PATENT DOCUMENTS

| | | | |
|---|---|---|---|
| 3,958,286 | 5/1976 | Rodinsky | 5/483 X |
| 4,060,280 | 11/1977 | Van Loo | 297/DIG. 5 X |
| 4,856,762 | 8/1989 | Selzer | 297/DIG. 5 X |

FOREIGN PATENT DOCUMENTS 2717497 10/1978 Fed. Rep. of Germany ........ 169/54

Primary Examiner—Kenneth J. Dorner
Assistant Examiner—J. Bonifanti
Attorney, Agent, or Firm—Baker & McKenzie

[57] ABSTRACT

A fire-resistant seating component. In a first embodiment, seat backs and pans are equipped with an enclosure containing a fire-retardant material which can flow out of early-release openings in the enclosure. The enclosure comprises at least one meltable zone which causes dispensation of the fire-resistant material at a temperature which is below the ignition temperature of the seating component. The enclosure is located at the lower portion of either a seat pan, a seat back, or both, so that burning rubbish such as paper cups and similar flammable debris disposed under a seat can be extinguished by the fire-retardant material as it flows vertically downwardly into the space beneath the seat. In a second embodiment, interior spaces within a seating component are coated or filled with non-combustible material to reduce the transfer of heat and the spread of fire. Such material may completely occupy the interior space within the component, or the material may simply coat the interior surfaces of the component. The non-combustible material may remain in contact, such as by adhesion, with the interior surfaces of the component to limit the amount of oxygen which comes into contact with the interior surfaces, thus limiting the tendency for the component to burn. Alternatively, the interior space within the component may be completely or partially filled with a highly heat absorbing material, such as water stabilized with a super absorbent polymer.

11 Claims, 2 Drawing Sheets

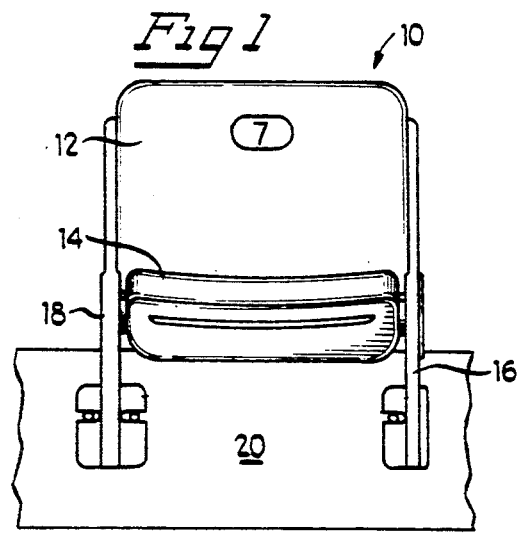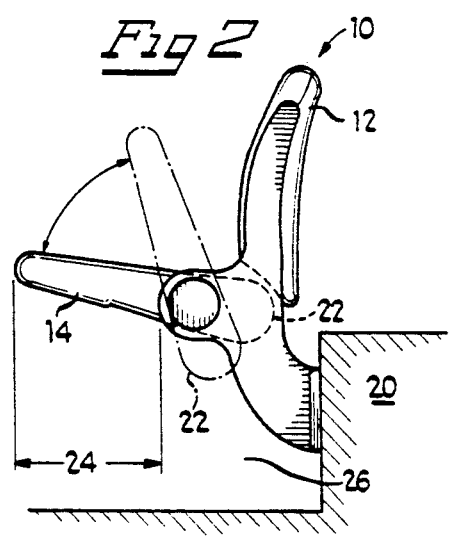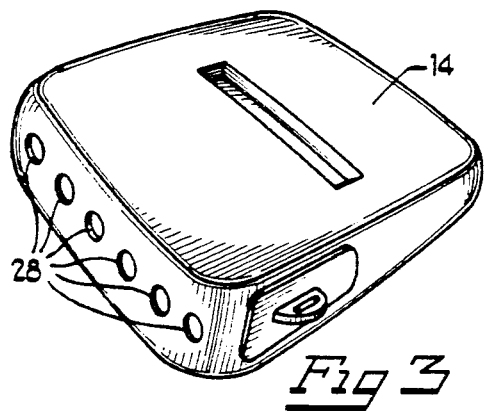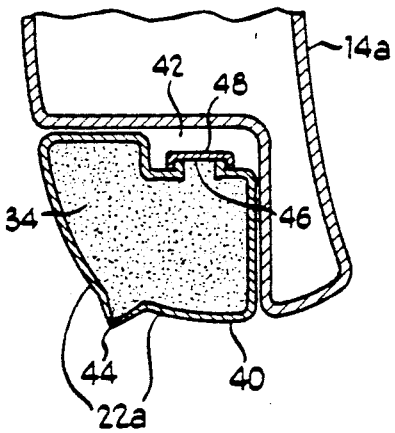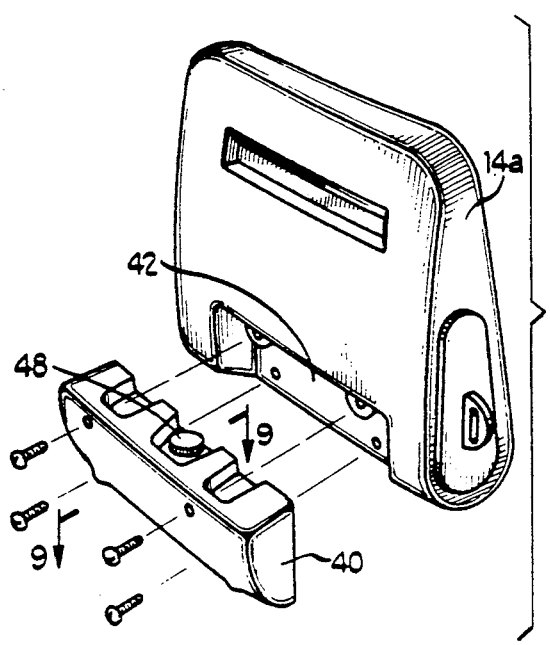

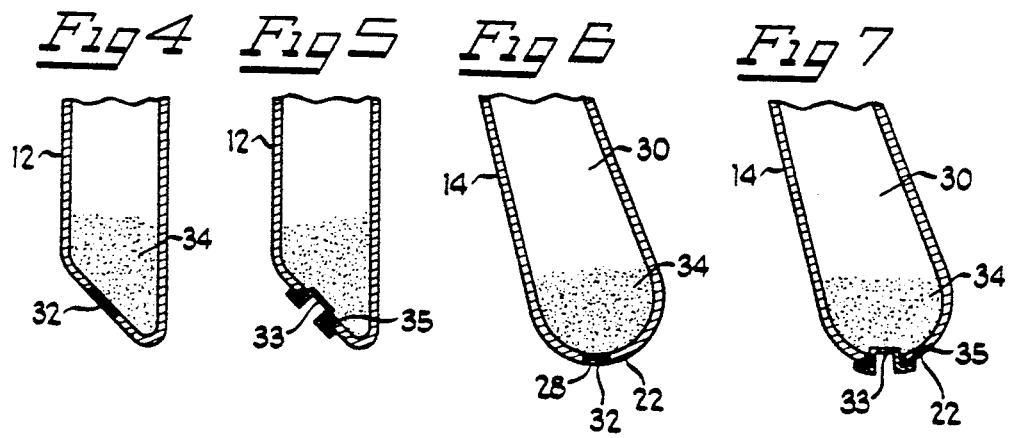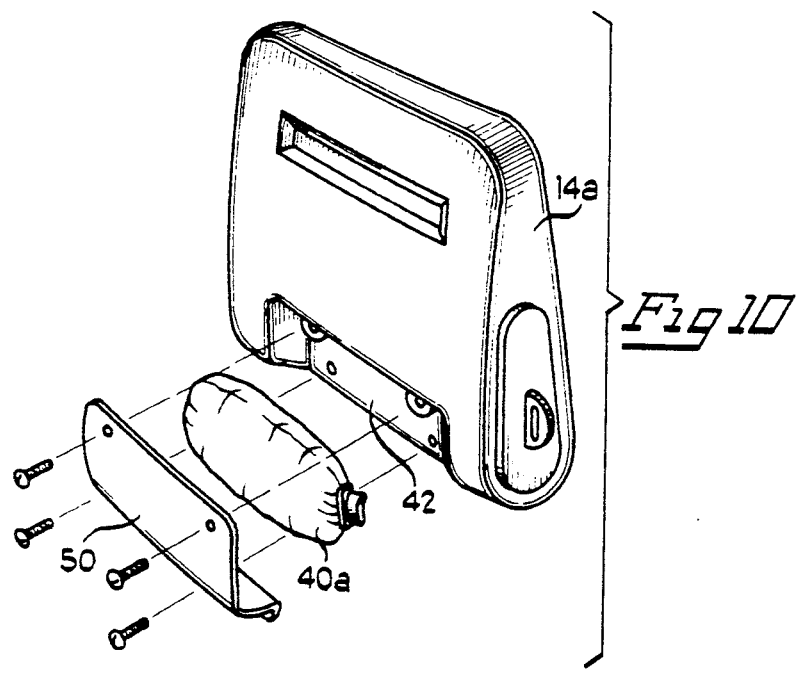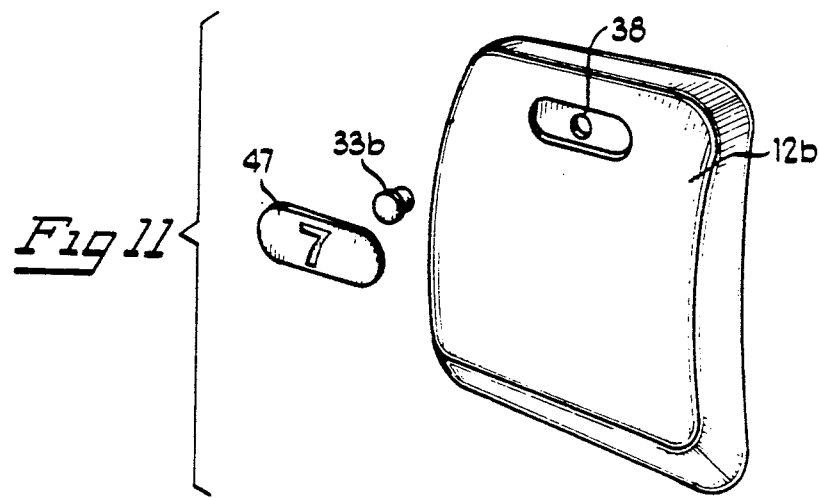

FIRE RETARDANT SEATING

BACKGROUND AND SUMMARY OF THE INVENTION

The present invention relates to seating which is capable of eliminating or reducing the spread of fire. In particular, the present invention relates to public seating, such as that which is used in arenas, auditoriums, theaters and stadiums, or on public transportation, such as trains, boats, aircraft and buses, and in seating used in public waiting areas.

In general, it is necessary to include at least some flammable material in a seating device. Such material may be padding, upholstery, or the structural components of the seating device, such as high density polyethylene. It can be expected that in most public seating situations, substantial amounts of rubbish will accumulate underneath the seating devices. As spectators or riders proceed to and from their seats, trash is kicked or tossed out of the path of the spectator to areas immediately beneath the seats. The rubbish which accumulates in such areas is generally flammable material, such as paper, polystyrene and the like. Because large amounts of such rubbish can accumulate, there is a substantial need for precautionary measures in the event that this material is ignited, either by accident, for example, from smoking materials, or intentionally.

One approach to this problem has been to construct the seating devices from material which resists burning. However, making a comfortable seat from non-flammable materials is not practical. Whether the seat is made of metal, wood, fiberglass or plastic, a substantial amount of flammable material is generally required.

It is therefore an object of the present invention to provide a seating component which reduces the spread of or extinguishes fires.

Another object of the present invention is to provide a fire-resistant seating component which is capable of retarding or extinguishing a fire before ignition of the seating component itself.

Still another object of the present invention is to provide a seating component which has the capability of retarding or extinguishing a fire prior to substantial damage to the seating component.

Yet another object of the present invention is to provide a seating system which substantially increases the likelihood that spectators or occupants can escape a fire without injury.

These and other objects of the present invention are achieved with a first embodiment in which a seating component comprising at least one generally hollow component within which is enclosed a generally nonflammable, flowable substance, either granular or liquid. At least one initially closed passageway is capable of opening to allow egress of the nonflammable, flowable material. The openable passageway may be a series of discrete holes sealed with a material with a melting point lower than that of the surrounding seating material. Alternatively, the openable passageway may be a thinned section integrally molded into the enclosure carrying the fire-retarding material. If a fire starts underneath the seating component of the present invention, the openable passageway will open prior to ignition of the surrounding seating material, and the fire will be at least retarded, and in most cases extinguished completely, by the flow of the fire-extinguishing material.

In a second embodiment of the present invention, fire is prevented from spreading by the placement of an initially flowable non-flammable fire-extinguishing or fire-resistant material which conforms to the contour of the inside of a hollow portion of a seating component. Such material may be of a type which hardens or which remains flowable. The spread of fire is restricted because the material prevents the flow of heated air, including oxygen, to at least one side of the seating component's structure, and because such materials will absorb significant amounts of heat, further reducing the tendency of the seating component to burn. It should be noted that either the seat only, or the back only, or the seat and back both may be provided with the fire-extinguishing or nonflammable material. One example of the second embodiment is one in which a hardenable or settable material is placed within the hollow portion of a seating component. Alternatively, a combination of water and a super absorbent polymer can be placed into a seating component.

BRIEF DESCRIPTION OF THE DRAWINGS

FIG. 1 is a front elevational view of a stadium chair of the type usable with the present invention.

FIG. 2 is a side elevational view of the stadium chair shown in FIG. 1.

FIG. 3 is a perspective view of the underside of a seat pan made in accordance with the present invention.

FIG. 4 is a sectional view through a seating component showing an early release opening in accordance with the present invention.

FIG. 5 is an alternative embodiment of a seal for an early release opening of the present invention.

FIG. 6 is a sectional view in a seating component showing an early release opening in accordance with the present invention.

FIG. 7 is a sectional view in a seating component showing an early release opening in accordance with the present invention.

FIG. 8 is an exploded perspective view of an alternative embodiment of a seat pan made in accordance with the present invention.

FIG. 9 is an enlarged sectional view taken along Lines 9—9 of FIG. 8.

FIG. 10 is an alternative embodiment of means for containing the fire-extinguishing material in accordance with the present invention.

FIG. 11 is an exploded perspective view of a seat back showing a concealed fill hole in accordance with the present invention.

DETAILED DESCRIPTION OF THE INVENTION

FIGS. 1 and 2 show generally the construction of a stadium chair 10, which is comprised of a seat back 12, a seat pan 14, and standards 16 and 18. The standards are fastened with bolts to a supporting structure 20. FIGS. 1 and 2 show the stadium chair 10 with the seat pan in the down position, and FIG. 2 shows in dotted lines the position of the seat pan in its non-use or up position. In the down position, the rear face 22 of the seat pan 14 faces down and back. When the seat pan is in the up position, the rear face 22 faces approximately straight down. The stadium chair 10 may be equipped with a spring operated mechanism which returns the seat pan 14 to the up position when a user leaves the stadium chair 10. Whether automatic or manual, the raising of the seat pan 14 forms an access aisle 24 immediately in front of the stadium chair. Similarly, an open space 26 is present immediately beneath the rear face 22 of the seat pan 14. It is in the open spaces 26 where rubbish is likely to accumulate, thus creating a fire hazard.

FIG. 3 shows the underside of a seat pan 14. A series of openings 28 extend across the rear face 22. As can be seen in FIGS. 6 and 7, the openings 28 are sealed to form an enclosure 30 within the seat pan 14.

FIG. 4 shows one form of seal 32, which is comprised of a layer of hot melt adhesive separating the atmosphere from the enclosed space 30. An example of the many polyolefin based hot melt materials currently available in Dexter Hysol polyolefin adhesive.

In the embodiments shown in FIGS. 4 through 7, fire-retardant material 34 is contained directly within the walls of the seating component. The term "seating component" referred to herein includes seat backs, seat pans, elongated benches and backs, and similar seating devices of the type used to support spectators in auditoriums and stadiums, riders in vehicles, and customers in waiting areas. FIGS. 4 and 5 show a seat back 12, and FIGS. 6 and 7 show a seat pan 14. The fire-retardant material 34 can be any of several materials. The important properties are non-flammability and the ability to fit easily through a relatively small opening. Dry silica sand has been found to be effective. Siliconized sodium bi-carbonate and siliconized ammonium phosphate are other examples of powder which may be used. It is also contemplated that liquid material, such as water, may be used. However, the difficulties of handling a liquid material make the powdered or granular materials preferable for use with seat pans, since, in many designs, a shaft extends through the seat pan, while seat backs contain no such shaft and can be more easily sealed.

FIG. 5 shows a sealing plug 33 disposed in the opening 28 in the seat back 12. The sealing plug 33 is held in place by an adhesive 35, which has a melting point substantially below the ignition point of the material comprising the seating component, which may be a high density polyethylene. The adhesive 35 holding in place the plug 33 is preferably the same kind of hot melt adhesive, discussed above, used to form the seal 32. FIG. 7 shows a plug 33 in an opening 28 in a seat pan 14.

In contrast to the embodiments discussed above, FIGS. 8, 9 and 10 show variations of the present invention in which a separate fire-retardant enclosure is attached to a seating component. FIG. 8 shows a detachable compartment 40 fastened to the rear portion of the underside of the seat pan 14a. The seat pan 14a is formed with a depression 42 which is shaped to receive the compartment 40.

FIG. 9 is a sectional view showing the compartment 40 in position within the depression 42. The compartment 40 has a lower wall 22a which includes a thinned section 44. The thinned section 44 may be a continuous length extending approximately the full length of the wall 22a. However, it may be sufficient to form discrete thinned areas in a manner similar to the openings 28 shown in FIG. 3. It should also be noted that the discrete openings 28 and the respective seals 32 and 33 could be replaced with a thinned section or sections, elongated or discrete, as shown in FIG. 9. In any case, it is preferable that the openings 28 or the thinned section 44 (or sections) extend across the width of the seat component with which they are associated. The openings form passageways for egress of the fire-extinguishing material. This will enable the fire-retardant material to flow onto a piece of burning debris disposed at any location under the seat to better perform the fire-extinguishing function.

The fire-retardant material 34 is placed into the compartment through the fill opening 46, which is sealed off with a cap 48. As flames emanate from rubbish burning in the space 26, the thinned sections 44 will melt prior to the melting of other areas of the walls of the compartment 40. The thinned section 44 therefore forms an early release opening to allow the fire-retardant material to flow downward onto the burning rubbish.

FIG. 10 shows an alternative embodiment of a form of the present invention which includes a separate compartment for the fire-retardant material. In the embodiment shown in FIG. 10, a flexible bag 40a is used to contain either a granular or liquid fire-retardant material. A cover plate 50 is used to hold the bag 40a in place within the depression 42, as shown in FIG. 10. The cover plate may have openings (not shown) which would have no need for a separate sealing material or device.

It may be preferable to provide the cover plate 50 with the sealing devices 32 or 33, as shown in FIGS. 4 through 7, to prevent accidental puncturing of or tampering with the bag 40a. The bag 40a is made of a material which has a melting point which is below the ignition point of the material comprising the cover plate 50 and the seat pan 14a.

An important aspect of the first embodiment of the present invention is the provision of means for early release of the fire-retardant material contained within an enclosure. The sealing material 32 (see FIGS. 4 and 6), the adhesive material 35 (see FIGS. 5 and 7), the thinned section 44 (see FIG. 9), and the material comprising the bag 40a (see FIG. 10), all should be made of a material which has a relatively low melting point, so that it will melt prior to the point at which the other components of the chair reach their ignition temperature.

In a second embodiment of the present invention, a seating component like the ones shown in FIGS. 1 through 7, i.e., a generally hollow blow-molded component made of high density polyethylene, is filled with a material which conforms to the inside of the component. A preferred characteristic is that the material be initially flowable, so that it can be inserted into the component through a small fill hole. Once inside the material will insulate, and, preferably, adhere to the inside surfaces of the component. By placing an insulating nonflammable material inside the component, the seating component will transfer heat more slowly, and will resist burning because oxygen will be unable to reach the inside surfaces of the component.

Materials which may be used in the second embodiment of the present invention include foamed concrete, including Portland cement with water and a foaming agent, neoprene foam, fiberglass, milled cellulosic material treated with fire-resistant chemicals, such as boric acid, borax, gypsum and clay. The above materials are examples of materials will generally fully occupy the interior space of the component. Alternatively, the inside surfaces of the component may be coated with a non-combustible paint or other coating, leaving the interior spaces within the component generally open.

Another alternative of the second embodiment is one in which a combination of water and a super absorbent polymer are placed within a molded high density polyethylene seating component. The super absorbent polymer stabilizes the water to prevent any noticeable movement of water within the component. The absorbent polymer and water mixture may, but need not, fully occupy the hollow space within the component. The stabilized water has a large heat absorbing capacity which greatly extends the time required to ignite the high density polyethylene shell of a seating component. A product which has been found to be an effective water absorbent polymer is "Dry Tech", sold by Dow Chemical. It may also be desirable to include in the water and polymer mixture an anti-bacterial agent, such as chlorine, to prevent the growth of undesirable organisms within the seating component.

In some cases, it may be sufficient to only fill a seat back with such heat absorbing material, since in some seating designs, the seat pan does not ignite easily unless the seat back also catches on fire. Also, in some seating designs, the spring holding the seat pan in the upright position will relax when heated. Movement of the seat pan to a generally horizontal position further reduces the tendency for it to burn. This further reduces the need to provide it with fire resistant capability. The use of liquid materials in the seat pan, whether or not such materials subsequently harden, is complicated by the presence of a carrier rod which, in many seating designs, penetrates the hollow space of a seat pan. Thus, it is advantageous to accomplish the required degree of fire resistance by modification of the seat back alone, if possible.

FIG. 11 shows a seat back 12b with a single hole 38, instead of the series of holes shown in FIG. 3. A second exhaust hole may be desirable to allow for rapid filling of the component. Furthermore, a simple plug 33b (not employing a low melting point adhesive) may be used. The fill hole can be located under the seat number plate 47 so that tampering with the plug 33b can be minimized. Such an arrangement may be used when an integrally molded, thinned section is formed in the seating component. The use of a fill hole under the seat number plate may also be used with an non-opening embodiment of the invention, such as one in which a combination of water and super absorbent polymer is placed inside the seating component to absorb heat and prevent ignition of the component.

The fire-retardant or non-flammable material of the present invention may be carried by the seat back 12, the seat pan 14, or both, in order to provide the chair 10 with the appropriate amount of fire extinguishing or fire resistant capability. The extent to which a seating design is equipped with such capability will depend upon the configuration of the seating components, the materials used, and other considerations, such as the use for which the seating is intended.

While the embodiments shown herein relate to stadium chairs, the present invention clearly has application in other seating systems, such as those which are used in auditoriums, on public transportation, and in public waiting areas.

While a specific embodiment of the present invention has been shown and described, it will be apparent to those skilled in the art that numerous alternatives, modifications, and variations of the embodiment shown can be made without departing from the spirit and scope of the appended claims.

I claim:

1. A seat comprising a cushion and an enclosure, said cushion having means for supporting the enclosure within the cushion, said means for supporting being plastic and generally combustible, said enclosure carrying a non-gaseous fire-extinguishing substance within said enclosure, said substance being releasable from said enclosure through passageway means, said enclosure having discrete early release means for causing dispensation of said substance upon heating of said cushion prior to ignition or substantial melting of said cushion and said enclosure, said early release means having substantially lower heat resistance than other materials comprising said cushion, and said early release means being disposed on a surface of said enclosure facing open areas generally below said cushion to ensure early exposure of said early release means to a heat source located below said cushion.

2. A seat in accordance with claim 1 wherein:
said cushion has walls forming a generally initially hollow member,
said enclosure being at least partially formed by walls of said hollow member.

3. A seat in accordance with claim 1 wherein:
said passageway means comprises at least one discrete opening in said enclosure, and said early release means comprises a seal closing off said opening,
said seal comprising meltable material having a melting point lower than the melting point of materials comprising said enclosure.

4. A seat in accordance with claim 3 wherein:
said meltable material extends across said opening and said material forms said seal.

5. A seat in accordance with claim 3 wherein:
said seal is a plug-like element separate from said meltable material,
said meltable material sealing spaces between said plug-like element and said opening.

6. A seat in accordance with claim 3 wherein:
said meltable material is a hot melt adhesive.

7. A seat in accordance with claim 6 wherein:
said cushion is a seat pan.

8. A seat in accordance with claim 6 wherein:
said cushion is a seat back.

9. A seat in accordance with claim 1 wherein:
said release means comprises a thinned section integrally formed in said enclosure,
said section being openable upon melting to form said passageway means.

10. A seat in accordance with claim 1 wherein:
said seat is a seating device selected from the consisting of a stadium chair, a seat in a public waiting area, a theater seat, a transit seat, including a railcar seat, a bus seat, a car seat, a boat seat, and an airplane seat.

11. A seat in accordance with claim 1 wherein said enclosure is separable from said cushion and disposed within a recess formed in said cushion.

* * * * *